(No Model.)

L. N. HARDMAN & A. TURLEY.
HARVESTER.

No. 562,358. Patented June 16, 1896.

Witnesses
Edwin G. McKee,
K. A. Nau.

Inventors
Leonard N. Hardman,
Aaron Turley,
By John Wedderburn,
Attorney ially applied to any wagon and provided with
UNITED STATES PATENT OFFICE.

LEONARD N. HARDMAN AND AARON TURLEY, OF ORLEANS, INDIANA.

HARVESTER.

SPECIFICATION forming part of Letters Patent No. 562,358, dated June 16, 1896.

Application filed November 11, 1895. Serial No. 568,598. (No model.)

*To all whom it may concern:*

Be it known that we, LEONARD N. HARDMAN and AARON TURLEY, citizens of the United States, residing at Orleans, in the county of Orange and State of Indiana, have invented certain new and useful Improvements in Harvesters; and we do hereby declare the following to be a full, clear, and exact description of the invention, such as will enable others skilled in the art to which it appertains to make and use the same.

This invention relates to certain new and useful improvements in corn-harvesters, and it has for its objects, among others, to provide a simple and cheap cutting attachment applicable to the various forms of harvesters and by which the corn may be readily cut. The improvement comprises an attachment readily applied to any wagon and provided with a seat on the cutter-bar, whereby it is held down to its work, and from which the operator can load the wagon with the corn as it is cut.

Other objects and advantages of the invention will hereinafter appear and the novel features thereof will be particularly pointed out in the appended claims.

The invention is clearly illustrated in the accompanying drawings, which, with the letters of reference marked thereon, form a part of this specification, and in which—

Figure 1:
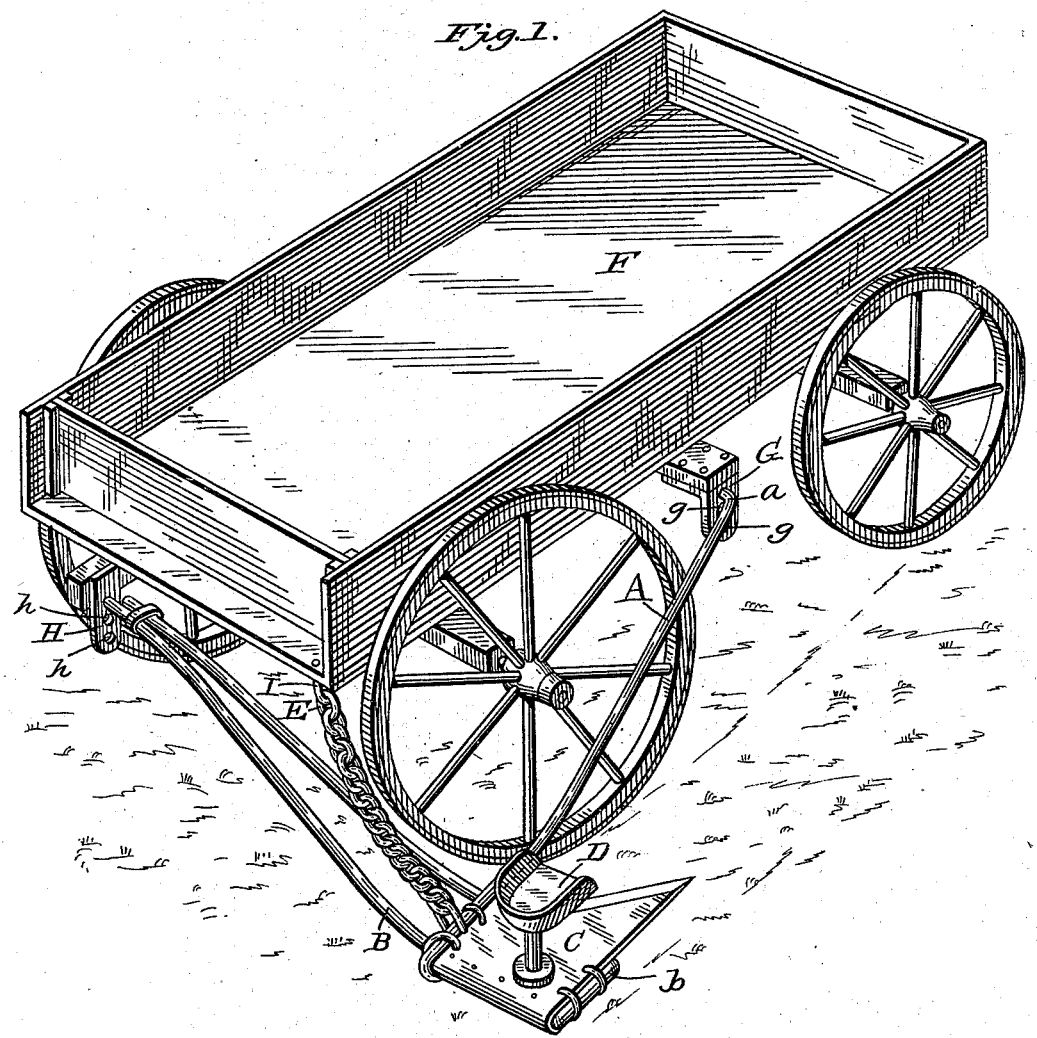
Figure 2:
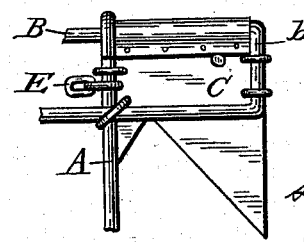

Figure 1 is a perspective view of a wagon with our improvement applied. Fig. 2 is a plan view of the attachment removed.

Like letters of reference indicate like parts in both of the views.

Referring now to the details of the drawings by letter, A designates an arm, the forward end of which is bent at a right angle, as at $a$, and B designates an arm bent upon itself, as at $b$, and secured to the arm A, while mounted upon the outer end of this arm B is a cutter C, of the shape shown, the said cutter being mounted upon the arm B, outside of the arm A, and attached or secured in position in any suitable manner. Mounted upon this cutter is a seat D for the operator. E is a chain, one end of which is attached to the arm A between the parallel bars of the arm B, as shown.

This device may be attached to any wagon, and in this instance it is shown as attached to the wagon F, by having its right-angled portion $a$ of the arm A, mounted in a bracket G, depending from the bottom of the wagon and having a plurality of openings $g$, by which the inclination of the cutter may be varied. The ends of the arm B are engaged in openings $h$ in the bracket H, depending from the rear end of the wagon, there being a plurality of these openings, so that the inclination of the cutter may be varied as occasion may require. The chain E is secured in a hook I, depending from the rear end of the bottom of the wagon.

In operation, the operator sits upon the seat D or stands upon the platform formed by the cutter, and as the wagon is propelled forward and the corn is cut by the cutter he gathers the same and places it upon the platform of the wagon.

The advantages of such an attachment will be readily appreciated by those having occasion to use such class of attachment.

What we claim as new is—

1. A corn-cutting attachment for wagons, comprising a cutter, a seat mounted thereon and arms disposed at substantially right angles to each other and supported from the wagon-body and extending beyond the side thereof and constructed for detachable engagement with the wagon, substantially as and for the purposes specified.

2. A corn-cutting attachment for wagons, comprising a cutter, a seat mounted thereon and arms disposed at substantially right angles to each other and supported from the wagon-body and extending beyond the side thereof and constructed for detachable engagement with the wagon, a chain connected with one of said arms and its other end secured to the wagon-body, substantially as and for the purposes specified.

3. The attachment described, comprising the arm A, with a right-angled portion $a$, the arm B secured thereto, a cutter supported upon the arm B, outside of the arm A, a seat upon said cutter and a chain connected with the arm A and adapted for connection with a hook on the wagon, substantially as and for the purposes specified.

In testimony whereof we have signed this specification in the presence of two subscribing witnesses.

LEONARD N. HARDMAN.
AARON TURLEY.

Witnesses:
CHARLES P. MUNGEN,
WILLIAM O. SCULLY.